(12) United States Patent
Raghavan et al.

(10) Patent No.: US 11,225,027 B2
(45) Date of Patent: Jan. 18, 2022

(54) MELT POOL MONITORING IN MULTI-LASER SYSTEMS

(71) Applicant: Applied Materials, Inc., Santa Clara, CA (US)

(72) Inventors: Kamala Chakravarthy Raghavan, Santa Clara, CA (US); Jeffrey L. Franklin, Santa Cruz, CA (US)

(73) Assignee: Applied Materials, Inc., Santa Clara, CA (US)

( * ) Notice: Subject to any disclaimer, the term of this patent is extended or adjusted under 35 U.S.C. 154(b) by 122 days.

(21) Appl. No.: 16/667,832

(22) Filed: Oct. 29, 2019

(65) Prior Publication Data

US 2021/0122120 A1    Apr. 29, 2021

(51) Int. Cl.

| | | |
|---|---|---|
| *B29C 64/393* | (2017.01) | |
| *G02B 26/12* | (2006.01) | |
| *G02B 26/00* | (2006.01) | |
| *G02B 6/35* | (2006.01) | |
| *B29C 64/277* | (2017.01) | |
| *B33Y 30/00* | (2015.01) | |
| *B33Y 50/02* | (2015.01) | |

(Continued)

(52) U.S. Cl.
CPC .......... *B29C 64/393* (2017.08); *B29C 64/153* (2017.08); *B29C 64/268* (2017.08); *B29C 64/277* (2017.08); *B33Y 10/00* (2014.12); *B33Y 30/00* (2014.12); *B33Y 50/02* (2014.12); *G02B 6/3512* (2013.01); *G02B 26/008* (2013.01); *G02B 26/12* (2013.01)

(58) Field of Classification Search
CPC .................................................. B29C 64/393
See application file for complete search history.

(56) References Cited

U.S. PATENT DOCUMENTS

| | | |
|---|---|---|
| 5,427,733 A | 6/1995 | Benda et al. |
| 6,815,636 B2 | 11/2004 | Chung et al. |

(Continued)

FOREIGN PATENT DOCUMENTS

| | | |
|---|---|---|
| JP | 04727722 | 7/2011 |
| WO | WO 2016/183210 | 11/2016 |

(Continued)

OTHER PUBLICATIONS

PCT International Search Report and Written Opinion in International Appln. No. PCT/US2020/057642, dated Feb. 3, 2021, 9 pages.

*Primary Examiner* — Larry W Thrower
(74) *Attorney, Agent, or Firm* — Fish & Richardson P.C.

(57) ABSTRACT

An additive manufacturing apparatus including a platform and a dispenser configured to deliver successive layers of feed material onto the platform. One or more light sources generate multiple light beams to selectively fuse feed material in a layer on the platform and multiple optical assemblies receive the multiple light beams, where each respective optical assembly transmits a respective light beam along a respective optical path through the optical assembly. Each light beam is directed to a scan spot on the layer of feed material on the platform to scan the light beam to sweep the scan spot along a controllable path across the layer of feed material on the platform. An optical multiplexer selectively transmits the return light emitted or reflected from the respective scan spot from a respective optical path of a selected respective optical assembly of the multiple optical assemblies to the measurement device.

11 Claims, 4 Drawing Sheets

(51) Int. Cl.
    *B29C 64/153*    (2017.01)
    *B29C 64/268*    (2017.01)
    *B33Y 10/00*     (2015.01)

(56) References Cited

U.S. PATENT DOCUMENTS

| | | | |
|---|---|---|---|
| 6,822,194 B2 | 11/2004 | Low et al. |
| 6,925,346 B1 | 8/2005 | Mazumder et al. |
| 6,930,278 B1 | 8/2005 | Chung et al. |
| 7,020,539 B1 | 3/2006 | Kovacevic et al. |
| 7,419,632 B2 | 9/2008 | Keller |
| 7,515,986 B2 | 4/2009 | Huskamp |
| 7,635,825 B2 | 12/2009 | Larsson |
| 7,713,454 B2 | 5/2010 | Larsson |
| 7,718,933 B2 | 5/2010 | Huskamp |
| 7,820,241 B2 | 10/2010 | Perret et al. |
| 7,850,885 B2 | 12/2010 | Philippi et al. |
| 8,414,281 B2 | 4/2013 | Schleiss et al. |
| 8,784,721 B2 | 7/2014 | Philippi et al. |
| 9,073,265 B2 | 7/2015 | Snis |
| 9,310,188 B2 | 4/2016 | Snis |
| 9,327,450 B2 | 5/2016 | Hein et al. |
| 9,399,321 B2 | 7/2016 | Ljungblad |
| 9,522,426 B2 | 12/2016 | Das et al. |
| 9,662,840 B1 | 5/2017 | Buller et al. |
| 9,676,145 B2 | 6/2017 | Buller et al. |
| 2004/0251242 A1 | 12/2004 | Suh |
| 2009/0206065 A1 | 8/2009 | Kruth et al. |
| 2014/0263209 A1 | 9/2014 | Burris et al. |
| 2014/0271328 A1 | 9/2014 | Burris et al. |
| 2015/0268099 A1 | 9/2015 | Craig et al. |
| 2016/0114431 A1 | 4/2016 | Cheverton et al. |
| 2016/0185048 A1 | 6/2016 | Dave et al. |
| 2016/0236279 A1 | 8/2016 | Ashton et al. |
| 2017/0021418 A1 | 1/2017 | Ng et al. |
| 2017/0056974 A1 | 3/2017 | Miyashita et al. |
| 2017/0090462 A1 | 3/2017 | Dave et al. |
| 2019/0047226 A1 | 2/2019 | Ishikawa |

FOREIGN PATENT DOCUMENTS

| | | |
|---|---|---|
| WO | WO 2016/198885 | 12/2016 |
| WO | WO 2017/071760 | 5/2017 |

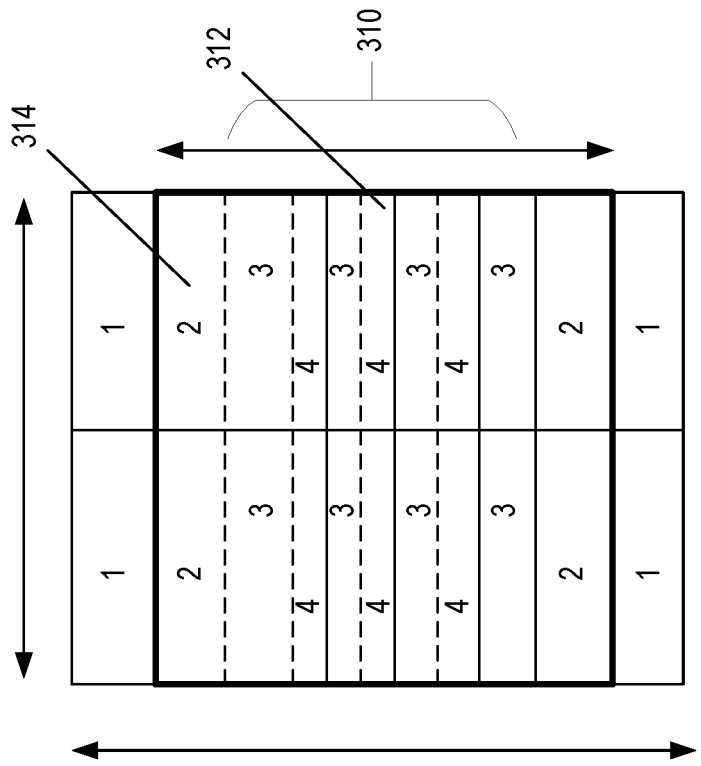
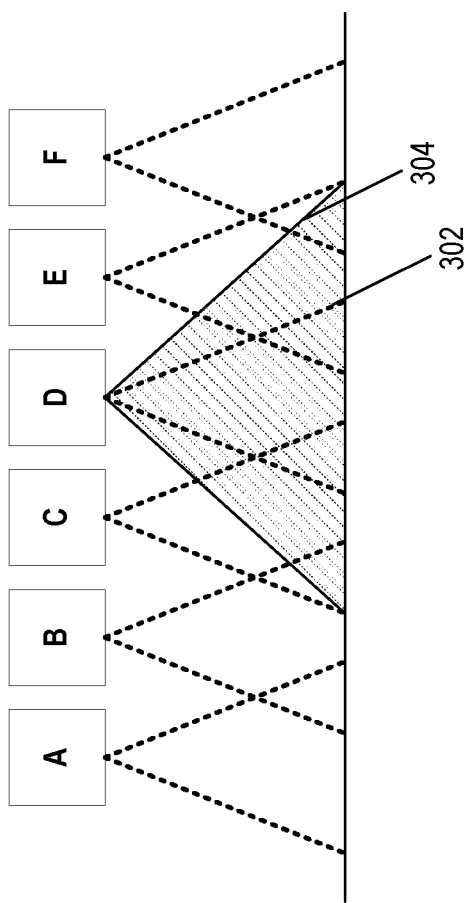
FIG. 3B
FIG. 3A

400

Collecting, by the measurement device, return light along the multiple optical paths via respective optical assemblies of the multiple optical assemblies
402

Receiving, by the controller, position data for the optical multiplexer, the one or more light sources, and the multiple optical assemblies
404

Determining one or more melt pool characteristics from the position data and the return light
406

Providing the one or more melt pool characteristics as output to the controller
408

Adjusting, by the controller and in response to the one or more melt pool characteristics, one or more process parameters
410

FIG. 4

MELT POOL MONITORING IN MULTI-LASER SYSTEMS

TECHNICAL FIELD

This disclosure relates to a melt pool monitoring apparatus for an energy delivery system for additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), or fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

In one aspect, an additive manufacturing apparatus includes a platform, a dispenser configured to deliver multiple successive layers of feed material onto the platform, one or more light sources configured to generate multiple light beams to selectively fuse feed material in a layer on the platform, multiple optical assemblies to receive the light beams, each respective optical assembly configured to transmit a respective light beam along a respective optical path through the optical assembly, to direct the respective light beam to a respective scan spot on the layer of feed material on the platform, to scan the light beam to sweep the respective scan spot along a respective controllable path across the layer of feed material on the platform, and to receive return light emitted or reflected from the respective scan spot, a measurement device, and an optical multiplexer configured to selectively transmit the return light from a respective optical path of a selected respective optical assembly of the plurality of optical assemblies to the measurement device.

Implementations may include one or more of the following features. In some implementations, the optical multiplexer is configured to selectively transmit the return light from only the respective optical path of the plurality of optical paths via only the respective optical assembly of the plurality of optical assemblies.

In some implementations, the optical multiplexer includes multiple adjustable mirrors, where each adjustable mirror is configured to selectively align the return light from the respective optical path via the respective optical assembly of the optical assemblies with the measurement device.

In some implementations, the optical multiplexer includes multiple optical fibers, each optical fiber configured to transmit return light from the respective optical path via the respective optical assembly of the plurality of optical assemblies, and an adjustable filter wheel, where each optical fiber of the multiple optical fibers is aligned with the adjustable filter wheel and where the adjustable filter wheel is configured to selectively allow the return light from a particular optical fiber of the multiple optical fibers to align with the measurement device.

In some implementations, the measurement device includes one or more of a high-speed, high resolution camera or an infrared camera. The apparatus can further include a controller that is configured to operate the optical multiplexer to direct light from the multiple optical assemblies to the measurement device in a particular sampling sequence.

In some implementations, the apparatus further includes a data processing apparatus in data communication with the measurement device and configured to collect, from the measurement device, return light along the plurality of optical paths via respective optical assemblies of the multiple optical assemblies. Position data is received from the controller and from the optical multiplexer, for the one or more light sources and the multiple optical assemblies. One or more melt pool characteristics are determined from the position data and the return light, and the one or more melt pool characteristics are provided as output to the controller.

In some implementations, the controller is further configured to receive the one or more melt pool characteristics and, in response, adjust one or more process parameters for one or more of the optical assemblies and light sources.

In some implementations, a first wavelength range of the multiple light beams is different that a second wavelength range of the return light. The apparatus may further include an air knife, and/or a heat source configured to pre-heat the feed material. In general, another aspect includes methods including receiving, by multiple optical assemblies, multiple light beams generated by one or more light sources configured to selectively fuse feed material in a layer on a platform, where the feed material is successively dispensed in a plurality of layers by a dispenser onto the platform, transmitting, by each respective optical assembly of the multiple optical assemblies, a respective light beam along a respective optical path through the optical assembly, directing, by each respective optical assembly of the multiple optical assemblies, the respective light beam to a respective scan spot on the layer of feed material on the platform to scan the light beam to sweep the respective scan spot along a respective controllable path across the layer of feed material on the platform, receiving, by each respective optical assembly of the multiple optical assemblies, return light emitted or reflected from the respective scan spot. For each optical assembly of the multiple optical assemblies: selecting, by an optical multiplexer, a particular optical path of a particular optical assembly, and transmitting, by the optical multiplexer, the return light from the particular optical path of the particular optical assembly of the multiple optical assemblies to a measurement device.

The subject matter described in this disclosure can be implemented so as to realize one or more of, without being limited to, the following advantages. Sequential monitoring of return light collected from multiple optical assemblies can be performed by a single measurement device, reducing cost of equipment and the instant volume of collected data.

Additionally, by using a single measurement device, complex metrology devices can be utilized resulting in more detailed information that can be extracted, e.g., melt pool dimensions and temperature gradients for a multi-light source system. A sequential pattern of collection from the multiple optical assemblies can be prioritized, collecting more frequently from areas of interest (e.g., edge regions of the powder layer on the platform), reducing an amount of total data being processed and analyzed and reducing a computational burden. By adapting the optical multiplexer to collect return light from the optical assemblies, any overhead cost and retro-adaptation of manufacturing equipment to adapt this monitoring system is greatly reduced.

The details of one or more implementations are set forth in the accompanying drawings and the description. Other features, aspects, and advantages of the subject matter will become apparent from the description, the drawings, and the claims.

BRIEF DESCRIPTION OF THE DRAWINGS

FIG. 3A is a schematic depicting an example beam spread of a set of light beams for an additive manufacturing and monitoring apparatus.

FIG. 3B is a schematic depicting an overlap of a set of light beams for a substrate.

FIG. 4 is a flow diagram of an example process for the additive manufacturing and monitoring apparatus.

Like reference numbers and designations in the various drawings indicate like elements.

DETAILED DESCRIPTION

Figure 1:
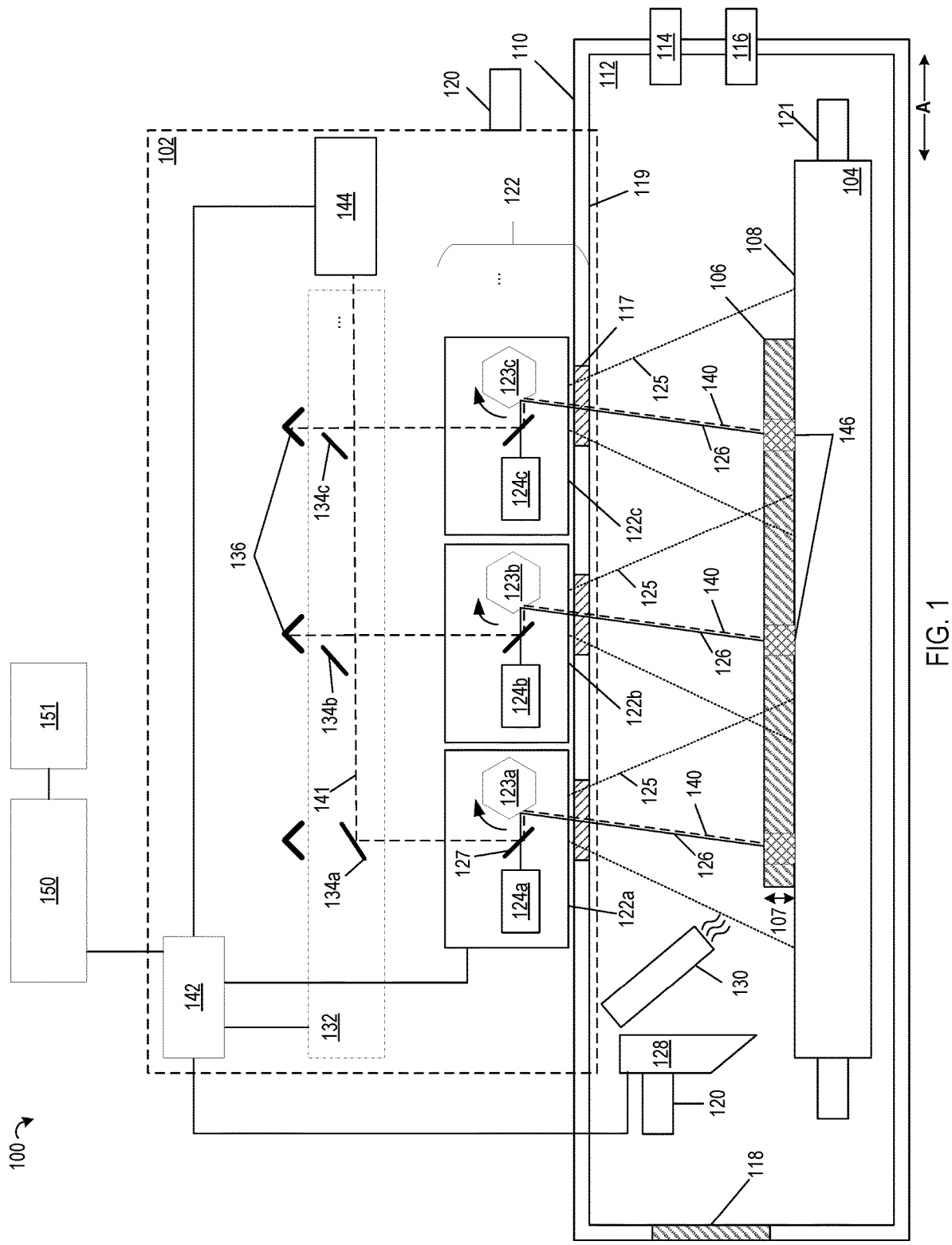
FIG. 1 illustrates a schematic side view of an example additive manufacturing (AM) apparatus.

In many additive manufacturing processes, energy is selectively delivered to a layer of feed material, e.g., powder, dispensed by an additive manufacturing apparatus to fuse the feed material in a pattern, thereby forming a portion of an object. For example, a light beam, e.g., a laser beam, can be reflected off a galvo scanner or a rotating polygon scanner to drive the light beam in a path across the layer of feed material. A melt pool is formed by the localized energy of the light beam in the feed material, where various properties of the melt pool impact the quality and conditions under which a new layer is formed in the feed material.

Monitoring the melt pool during the additive manufacturing process can yield information fusing quality of the layers to a microstructure. Melt pool formation and evolution is a dynamic process and requires measurement devices that can collect data rapidly, e.g., at kHz speeds.

An additive manufacturing system can use multiple lasers that provide multiple light sources for delivering energy to the layer of feed material, with each laser forming a separate melt pool. However, monitoring of multiple melt pools using dedicated equipment for each laser can be costly and an inefficient use of processing power.

The technology of this patent application utilizes an optical multiplexer to collect, from multiple optical assemblies each configured to steer a light source along a respective optical path to a powder bed to generate a melt pool in the powder bed on a platform, a return light via a particular optical path of a particular optical assembly.

More particularly, the technology utilizes an optical multiplexer (e.g., a series of adjustable mirrors) to direct return light, e.g., reflected light from the melt pool and reflected light source light, collected by a respective optical assembly of multiple optical assemblies into a measurement device (e.g., a high-resolution camera and/or infrared camera). The return light can be generated by a melt pool formed in the powder layer deposited on a platform, where the melt pool is generated by a light source (e.g., high-power laser) that is directed along a particular optical path by a particular optical assembly (e.g., galvonic mirror or rotating hexagonal mirror assembly) of a set of multiple optical assemblies. The system may include multiple light sources, each steerable along a particular optical path using a respective optical assembly, a single light source steerable into multiple optical paths using multiple optical assemblies, or a combination thereof. A controller can be configured to operate the optical multiplexer and select return light via a particular optical path to sample at the measurement device, e.g., by selectively deflecting all but one mirror of the optical multiplexer or selecting blocking all but one optical fiber source of the optical multiplexer. Background correction can be performed to isolate return light that results from a particular optical assembly, e.g., from a particular light source and optical assembly combination, as well as to control for interference effects, e.g., ambient light effects.

An optical path can be defined using a set of optics that are configured to extract individual melt pool information, where the set of optics utilized to define the optical path include dichroic mirrors, notch filters, short and/or long pass filters, and simple reflecting, e.g., automatically collapsible, mirrors. Automatically collapsible mirrors can be utilized to provide "on" and "off" positions for a particular optical path, where in the "on" position the mirror position will be aligned such that reflected light from a particular melt pool will be guided to a melt pool measurement device along the particular optical path. In some configurations, only a single automatically collapsible mirror can be selected to be in an "on" state at a given instant such that only reflected light from a particular melt pool is directed to the melt pool measurement device at a given time. Particular configurations of the optics to define the optical paths for each of the multiple melt pools are described in detail below.

A technique to monitor the progression of the melt pools formed by the multiple lasers is described here, where return light from the melt pool can be collected by the control optics, e.g., the galvo scanner or rotating polygon scanner, for the laser and reflected into a measurement device to capture and process the optical signal data.

In some implementations, multiple light sources are operational during the additive manufacturing process, e.g., six light sources simultaneously fusing the powder bed of material. At a given instant during the additive manufacturing process, multiple melt pools can be generated, e.g., six melt pools. To monitor the multiple melt pools during the process, each melt pool of the multiple melt pools can be monitored in turn, e.g., in a sequential process, such that a melt pool generated by a particular light source of the multiple light sources is monitored at a given time.

Additive Manufacturing Apparatus

FIG. 1 illustrates a schematic side view of an example additive manufacturing (AM) apparatus 100 that includes a build platform 104 (e.g., a build stage), a dispenser 128 to deliver layers of one or more powders 106 on a top surface 108 of the platform 104, and an optical head 102 that can direct light beams 126 onto the powder to form multiple melt pools 146 to fuse the powder and optically monitor the melt pools. By repeatedly dispensing and fusing layers of powder, the apparatus 100 can form a part on the platform.

The dispenser 128 and the build platform 104 can both be enclosed in a housing 110 that forms a sealed chamber 112, e.g., a vacuum chamber, that provides a controlled operating environment. The housing 110 can include an inlet 114 coupled to a gas source and an outlet 116 coupled to an exhaust system, e.g., a pump. The gas source can provide an inert gas, e.g. Ar, or a gas that is non-reactive at the temperatures reached by the powder for melting or sintering, e.g., $N_2$. This permits the pressure and oxygen content of the interior of the housing 130 to be controlled. For example, oxygen gas can be maintained at a partial pressure below 0.01 atmospheres.

The chamber 112 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Ti powder particles. A load lock chamber accessible through a valve 118, e.g., a slit valve, can be used to separate the housing 110 from the external environment while permitting parts, e.g., the build platform with the fabricated object, to be removed from the chamber. For example, the build platform 104 can be movable on a track 120, e.g., a rail.

The optical head 102 includes multiple optical assemblies 122, e.g., six optical assemblies 122. Each optical assembly 122 includes a reflector assembly 123, e.g., dual galvo mirror scanner, or a polygonal mirror scanner in conjunction with a steering mirror, configured to sweep a respective light beam 126 along a path on the uppermost layer of the powder bed 106. In some implementations, each sweep can be a linear path on powder bed 106, as described in further detail below with reference to FIG. 3B.

The housing 110 includes multiple windows 117 on a surface, e.g., a ceiling or top surface 119, of the housing 110. The multiple windows 117 are aligned on the housing 110 with respect to the optical head 102 such that light beams 126 from respective optical assemblies 122 can be directed through the windows to the powder bed 106 within the chamber 112. Dimensions and spacing of the multiple windows 117 on the housing 110 can depend in part on a scan area 125 of each of the optical assemblies 122.

In some implementations, each optical assembly 122 is aligned with a corresponding window 117. The optical head 102 can be adjusted, e.g., using rails 120, to position the optical assemblies 122 and respective light beams 126 over the windows 117 during operation of the system 102. In some implementations, there are more windows than optical assemblies 122, and the optical head 102 can be moved laterally to position the optical assemblies 122 over successive different groups of windows. In some implementations, the optical assemblies 122 include a first optical assembly 122a, a second optical assembly 122b, and a third optical assembly 122c. The optical head 102 can include six or more optical assemblies, each optical assembly 122 configured to sweep a respective light beam 126 along a path on the powder bed 106.

In some implementations, at least one reflector assembly 123, e.g., a dual galvo mirror scanner, is configured to scan a light beam along an arbitrary path; the light beam 126 is not constrained to move along a linear path.

The optical assemblies 122 include one or more light sources 124, e.g., lasers, coupled into each respective optical assembly 122. In some implementations, each optical assembly 122 has a respective light source 124, e.g., a laser. In some embodiments, fewer light sources 124 are configured to provide the light beams 126 to the multiple respective reflector assemblies 123, e.g., there may be one laser source for multiple reflector assemblies 124. Although FIG. 1 illustrates separate and independently controllable light sources 124 for the respective light beams 126, there can be a common light source 124 that generates a light beam 126 that is split, e.g., with a beam splitter, into multiple light beams 126.

The light source(s) 124 can be a light-emitting diode, e.g., a 400-450 nm blue light emitting diode, a laser, e.g., a 500-540 nm second harmonic laser, or another appropriate light source. A reflector assembly 123 is positioned in the path of the light beam 126 to reflect the light beam 126 from light source 124 toward the platform 104.

As the light beam 126 sweeps along the path on the powder bed 106, the light beam 126 can be modulated, e.g., by causing the light source 124 to turn light beam 126 on and off, in order to deliver energy to selected regions of the powder bed 106.

Assuming the reflector assembly 123 includes a rotating polygon mirror, rotation of the polygon will cause each facet to move so as to cause the light beam 126 sweep along the path on the platform 104. The axis of rotation of the polygon can be perpendicular to the direction of travel of the first light beam along the path. In conjunction with a steering mirror to adjust the position of the path on the platform 104, a sequence of linear sweeps along the path by the light beam 126 can create a raster scan of the light beam 126 across the powder bed 106.

In some implementations, the light beam 126 can pass through one or more focusing lenses. A focusing lens can be positioned before and/or after the respective polygonal beam scanner.

A field of view or scan field area 125 of each optical assembly 122 can cover at least a half of the width of the build area on the platform 104. In some implementations, the respective fields of view 125 of each optical assembly 122 of the multiple optical assemblies 122 can partially overlap with at least one other optical assembly 122, e.g., by no more than about 25%, e.g., no more than 10%. Further details of the overlapping fields of view of the light beams 126 are described with reference to FIGS. 3A and 3B below.

In some implementations, the fields of view 125 of each optical assembly 122 of the multiple optical assemblies 122 each cover the entire the width of the build area on the platform 104.

In some implementations, an optical assembly 122c can include a light source 124c, e.g., a laser, to generate a light beam 126c. The light source 124c can be relatively high power, e.g., 1-10 kW. The light beam 126c can be scanned across the build area on the platform 104 by a pair of galvo mirror scanners 123c that can provide motion of the third light beam 126c along two perpendicular axes. A scan lens (not pictured) can be used to focus and direct the light beam 126c. Due to the pair of galvo mirror scanners 123c, the light beam 126c can traverse the powder bed 106 in an arbitrary path where the light beam is not constrained to move along a liner path or a raster scan. For example, the light beam 126c of optical assembly 122c, e.g., the area addressable by the pair of galvo mirror scanners 123c, can span the entire width of the build area on the platform 104, or can span less than the entire length of the build area on the platform 104.

The various light beams 126 generated by respective optical assemblies 122 can each be used for pre-heating of the powder, fusing of the powder, and/or heat treatment of the layer. In the case of pre-heating, a light beam raises the temperature of the powder from an initial temperature to an elevated temperature that is still below the temperature at which the powder melts or fuses. In the case of fusing, a light beam scans the layer of powder and selectively raises the temperature of the powder to a temperature sufficient for the powder to melt or fuse. In the case of heating-treatment, a light beam delivers heat so as to control the rate of cool down of the material.

Optical assemblies 122 can be configured to direct light beams 126 toward the uppermost layer of powder of the powder bed 106 on the platform 104 and that can be used at least for fusing of the layer of powder on the platform 104. One or more of the light beams 126 can be used for pre-heating and/or heat-treating the layer of powder.

The powder distribution dispenser 128 can be configured dispense a powder bed 106 onto the build platform 104, e.g., directly on the build platform 104 or on a previously deposited layer. In some implementations, the powder distribution dispenser 128 includes a hopper (not pictured) to receive the one or more different powders. The powder distribution dispenser 128 can have a controllable aperture, e.g., a valve, that controls whether the powder is dispensed onto the platform 104. In some implementations, the powder distribution dispenser 128 includes a plurality of independently controllable apertures, so that the powder can be controllably delivered along a line perpendicular to the direction of travel A.

In some implementations, the powder distribution dispenser 128 can also include a spreader, e.g., a roller or blade, to compact and spread powder dispensed by the powder distribution dispense 128. The spreader can provide the layer with a substantially uniform thickness. In some cases, the spreader can press on the layer of powder to compact the powder.

In some implementations, the powder distribution dispenser 128 can also optionally include one or more sensors, e.g., cameras or other non-contact sensors, to detect properties of the layer before and/or after powder has been dispensed by powder distribution dispenser 128.

In some implementations, the additive manufacturing system 100 includes additional components, for example, an air knife (not pictured) to generate a flow of gas across the layer of power of the powder bed 106. This flow of gas from the air knife can help reduce spatter caused by fusing of the powder by the one or more light beams 126.

The additive manufacturing system 100 can additionally include a heater 130 configured to raise the temperature of the deposited powder. The heater 130 can heat the deposited powder bed 106 to a temperature that is below its sintering or melting temperature. The heater 130 can be, for example, a heat lamp array.

In some implementations, the heater 130 can be used for pre-heating and/or heat treatment of the layer. The heater 130 can include at least one array of heat lamps, e.g., infra-red lamps. For example, the heat source 130 can include a first array of heat lamps positioned to illuminate a region before (relative to the direction of travel A) a linear scan region below the optical assemblies 122 to provide pre-heating of the powder bed 106, and a second array of heat lamps positioned to illuminate a region after (relative to the direction of travel A) the linear scan region below the optical assemblies 122 to provide heat-treatment of the powder bed 106.

Each array of heat lamps of the heater 130 can be arranged along a plane that oblique relative to the top surface 108 of the build platform 104. This permits the heater 130 to sit outside the field of view 125 of the each of the optical assemblies 122.

In some implementations, the optical head 102 can translate with respect to the platform 104 along various degrees of freedom utilizing one or more tracks or rail systems. In some implementations, platform 104 can be configured on track 120 to be laterally positionable relative to the platform 104. For example, the optical head 102 can be moved laterally between various positions in which the optical assemblies 122 overly different windows.

The platform 104 can be movable along a vertical axis. In particular, after each layer is fused, the platform 104 can be lowered by an amount equal to a thickness 107 of the deposited layer of the powder bed 106. This can maintain a constant height difference between the dispenser and the optical head and the top of the powder on the platform 104. A drive mechanism 121, e.g., a piston or linear actuator, can be connected to the platform 104 to control the height of the platform. Alternatively, the platform 104 can be held in a fixed vertical position, and the optical head 102 and dispenser 128 can be raised after each layer is deposited.

In some implementations the platform 104 can translate with respect to the optical head 102. For example, the apparatus 100 can include a support, e.g., a linear rail or pair of linear rails 121, along which the platform 104 can be moved by a linear actuator and/or motor.

In order to perform optical monitoring of powder layer, e.g., of the melt pools 146, the optical head 102 can be configured to receive light from the same region that is being scanned by the light beam 126. That is some light, either reflected or emitted from the spot impinged by the light beam 126, travels along a return path 140 through optical assembly 122. This return light can be split off, e.g., by a dichroic mirror 127, to be monitored by a measurement device 144.

The optical head 102 additionally includes an optical multiplexer 132. This optical multiplexer can include, as depicted in FIG. 1, a set of automatically adjustable mirrors 134 and beam dump 136. Adjustable mirrors 134 can be operable in "on" and "off" positions depending on a physical positioning of the mirrors 134 relative to an optical collection path 140 of the return light.

In some implementations, adjustable mirrors 134 can include motorized flip mounts with at least two defined positions including a first position where the mirror can be rotated or "flipped" into an "on" position such that the return beam 140 is directed along an optical path towards measurement device 144. The motorized flip mount can have a second position where the mirror can be rotated or "flipped" into an "off" position such that the return beam 140 is directed along an optical path towards a beam dump 136 or the housing 110 and away from the measurement device 144. The positions of the motorized flip mounts can be controlled by controller 142, where control signals can be provided by the controller 142 to the flip mounts to automatically change the respective positions.

The positions of each of the mirrors 134 can be controlled by a controller 142, where controller 142 can optionally direct return light along an optical path 141 or divert the return light into a respective beam dump 136 or into housing 110. For example, mirror 134a can be operated in an "on" mode while mirrors 134b and 134c are operated in an "off" mode such that only return light along optical path 141 is directed to the measurement device 144.

Measurement device 144 can comprise a high-speed, high-resolution camera and/or an infrared (IR) camera configured to receive the return light and extract melt pool information from the return light. In one example, a high-speed, high-resolution camera is configured to detect ultraviolet and visible (UV-Vis) wavelengths at a sampling frame rate of up to tens of kilohertz (kHz), e.g., ~50 kHz. In another example, an IR camera is configured to detect infrared wavelengths at frame rates up to tens of kHz, e.g., ~50 kHz.

Measurement device 144 can receive return light along optical path 141 that includes melt pool emission light from a particular melt pool 146 and/or reflected light from a light source 124 and reflected from the melt pool 146 and/or surrounding layer. Data from the measurement device 144 can be used to determine characteristics of the melt pool 146 and light source 124 operation, by correlating the melt pool emission light to one or more characteristics of the melt pool, e.g., using known melt pool dynamics, simulations, and/or experimental data. Characteristics of the melt pool 146 include, for example, thermal gradients, temporal evolution of the melt pool, volatility of the melt pool, etc. In some implementations, a wavelength range of the melt pool emission light and the wavelength range of the light source are different.

Measurement device 144 can be in data communication with controller 142, where controller 142 can be configured to provide operating instructions, e.g., data collection parameters, to the measurement device 144. Additionally, controller 142 can receive or calculate melt pool characteristics based on data from the measurement device 144, e.g., melt pool dimensions, temperature gradient, volatility, etc. These melt pool characteristics can be used as process-control feedback and one or more operating parameters of the apparatus 100 can be adjusted based on the melt pool characteristics. Operating parameters of the apparatus 100 can include operation of the optical head 102 and/or platform 104. For example, the controller 142 can adjust an output energy for a light source 142, a raster speed or pattern of the optical assemblies 122, or the like, in response to melt pool characteristics determined from the return light 140 captured by the measurement device 144.

In some implementations, return light from two or more melt pools 146 can be collected by a particular optical assembly 122 and directed to the measurement device 144 by the optical multiplexer 132. The return light 140 captured by the measurement device 144 can be de-convoluted to analyze only the return light 140 from a single melt pool 146 at a given time. Techniques for collecting and analyzing only return light 140 from a single melt pool 146 is discussed in further detail below with reference to FIG. 4.

In some implementations, measurement device 144 is in data communication with a data processing apparatus 150. Data processing apparatus 150 can be, for example, a computer, server, mobile device, or the like. Data processing apparatus 150 can perform further analysis and/or display results from the melt pool characteristics determined from the return light captured by the measurement device 144. The data processing apparatus 150 can include a display to present real-time information to a user of the operation of the apparatus 100. For example, a display 151 can present real-time plots of the evolution and temperature gradient of the multiple melt pools 146. In another example, display 151 can indicate to a user which melt pool of the multiple melt pools 146 is being currently monitored.

Controller 142 is coupled to the various components of the apparatus, e.g., power sources for the light sources and heaters, actuators and/or motors to move the optical head 102, optical assemblies 122 and optical multiplexer 132, actuators and/or motors for the components, e.g., dispensers and beam scanners, etc., to cause the apparatus to perform the necessary operations to fabricate an object.

The controller 142 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 142 can generate instructions usable by each of the systems operable with the controller 142, for example, to dispense the powder bed 106, to fuse the powder bed 106, to move various systems of the apparatus 100, and to sense properties of the systems, powder, melt pools 146 and/or the additive layers of the object formed. In some implementations, the controller 142 can control the powder distribution dispenser 128 to selectively deliver the different powder particles to different regions of the powder bed 106.

The controller 142, for example, can transmit control signals to drive mechanisms that move various components of the apparatus. In some implementations, the drive mechanisms can cause translation and/or rotation of these different systems, including. Each of the drive mechanisms can include one or more actuators, linkages, and other mechanical or electromechanical parts to enable movement of the components of the apparatus.

During operation of the apparatus 100, the one or more optical assemblies 122 can direct light sources 124 along beam 126 to the power bed 106 to selectively melt a portion of the powder bed 106 to form one or more melt pools 146 within the powder bed 106.

Melt pool 146 is formed by the localized energy of the light beam 126 in the powder bed 106, where various properties of the melt pool 146 impact the quality and conditions under which a new layer is formed in the feed material. In some implementations, multiple melt pools 146 are formed simultaneously, each by a respective light beam 126 incident on the powder bed 106. Each of the melt pools 146 generates a respective return light 140 that is collected via a respective optical assemble 122 and selectively directed by the optical multiplexer 132 into the measurement device 144 for melt pool analysis.

Further details of the operation of apparatus 100 are described with reference to FIG. 4 below.

Figure 2:
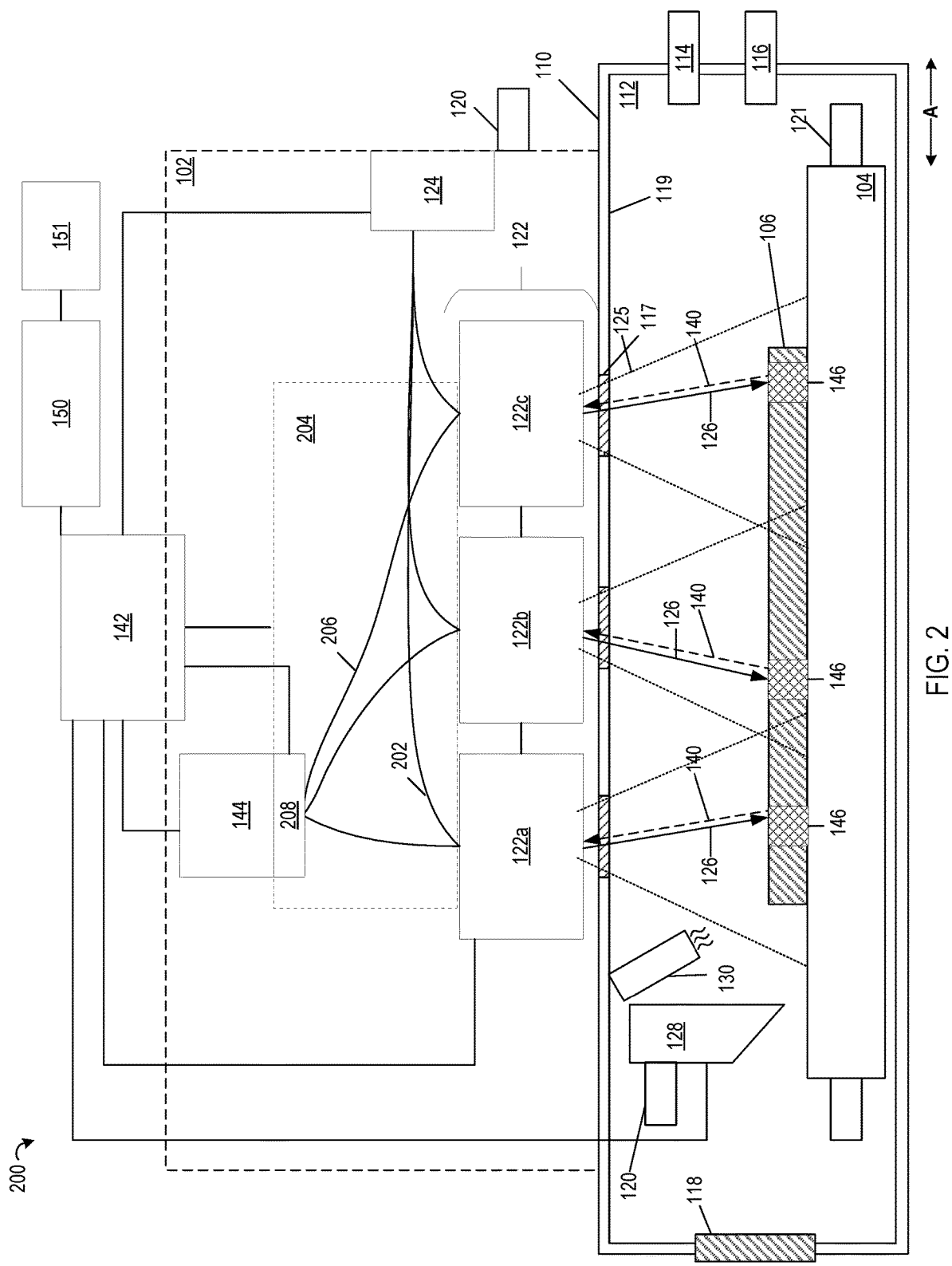
FIG. 2 illustrates a schematic view of another example AM apparatus.

In some implementations, one or more components of the optical assembly 122 and/or the optical multiplexer 132 can be replaced with a flexible optical fiber. FIG. 2 illustrates another schematic side view of an example additive manufacturing (AM) apparatus 200. As depicted in FIG. 2, a single, fiber-based light source 124 is coupled to the optical assemblies 122 by a fibers 202. Light source 124 can be, for example, a fiber laser is 1070 nm CW operated at around 200-400 Watts. In one example, high beam-quality fiber lasers are used. For example, the end of the flexible optical fiber 202 would be attached to the light source 124, and the other end of the flexible optical fiber would be movable and secured in a fixed position relative to the beam scanner, e.g., polygonal mirror or galvo mirror scanner 123.

Similarly to the operation of optical assemblies 122 in FIG. 1, each optical assembly 122 collects return light 140 which is coupled, e.g., using a fiber-optic coupler, to a respective fiber 206. The multiple fibers 206, each collecting return light from a respective optical assemble 122, can be arranged on a multi-fiber coupler with an attached filter wheel 208 which is configured to allow light output from a single fiber 206 to reach the measurement device 144.

FIG. 3A is a schematic depicting example beam spreading of a set of light beams for an additive manufacturing and monitoring apparatus 100. As described with reference to FIGS. 1 and 2 above, each apparatus 100 and 200 can include multiple light beams 126 directed to the powder bed 106 on the platform 104, each light beam 126 from a respective optical assembly 122 and generating a respective melt pool 146 in the powder bed 106.

Referring now to FIG. 3A, six light sources A-F are depicted having overlapping beam spread for each of the six light sources. In some implementations, each light source A-F can have an optimal beam spread 302 and a possible beam spread 304, where a possible beam spread 304 can include a larger region of overlap with at least one other light source. An optimal beam spread 302 can be defined in part by a beam spread having at least a threshold of performance of the light source, e.g., light source D. Depending in part on optimal beam spread 302 and possible beam spread 304 of each light source A-F, a particular region of the platform, e.g., platform 104, can be accessible by multiple light sources A-F.

FIG. 3B is a schematic depicting an overlap of a set of light beams for a platform, where the numerical value describes the number of light sources A-F that can apply light energy to the particular region. As depicted in FIG. 3B, a center region 310 of the platform can have overlapping beams from at least 3-4 of the multiple light sources A-F. For example, region 312 can have overlapping beam spreading from light sources B, C, D, and E.

In some implementations, a region, e.g., 312, having multiple overlapping light sources can result in reflected light from a particular melt pool being captured by the optical assemblies 122 associated with each of the multiple overlapping light sources. Various techniques for performing melt pool analysis using reflected light 140 from only a particular optical assembly 122 include a light source 124 are described below with reference to FIG. 4.

FIG. 4 is a flow diagram of an example process for the additive manufacturing and monitoring apparatus. Return light is collected, by the measurement device, along the multiple optical paths via respective optical assemblies of the multiple optical assemblies (402). As described with reference to FIGS. 1 and 2, return light 140 is collected by measurement device 144 via the multiple optical paths of multiple optical assemblies 122. Return light collected from a particular optical path via a particular optical assembly 122 can be selectively directed to the measurement device 144 by the optical multiplexer 132, e.g., by turning "on" a particular mirror 134 of the multiple mirrors or by selecting a particular fiber 206 using the filter wheel 208. By selecting a particular mirror 134 or fiber 206 from the optical multiplexer, a single return signal is allowed to complete the pathway to the measurement device 144 while the others are deflected away from the measurement device 144, e.g., into the housing 110.

In some implementations, a monitoring sequence can be optimized to more closely monitor areas of interest of the area being processed, e.g., the edges rather than the middle regions of a powder bed 106 on a platform 104. In some implementations, monitoring the edges more frequently than a middle of a powder bed 106 on the platform 104 can provide an improved feedback control loop. The controller 142 can provide instructions to the optical multiplexer 132 to select particular mirrors 134 or fiber 206 that are associated with respective optical assemblies 122, e.g., optical assemblies 122a, that are configured to provide a light beam 126 to an edge region of the powder bed 106 on the platform 104, e.g., an edge region 314.

In some implementations, various of noise reduction and/or background correction techniques can be utilized to isolate measurements of the reflected light 140 from the multiple melt pools 146 using the optical multiplexer 132 and optical assemblies 122. In one example, background correction can be performed by sampling a dark measurement and/or an ambient measurement with all light sources 124 off.

In some implementations, noise reduction can be performed using preliminary scans where combinations of one or more of the optical assemblies 122 are active, e.g., emitting a respective light beam 126 at a time, and where a particular mirror 134 or fiber 206 is selected to direct light into the measurement device 144. For example, a set of preliminary scans can include sampling the following combinations in turn: a first measurement at the measurement device 144 with light beam 126a active and first mirror 134a "on," a second measurement at the measurement device 144 with light beam 126a and light beam 126b active and first mirror 134a "on," and a third measurement at the measurement device 144 with light beam 126b active and first mirror 134a "on." The preliminary scans can be utilized, for example, to isolate only the return light through a particular optical assembly 122a from a melt pool that is generated by the particular optical assembly 122a using the mirror 134a of the optical multiplexer 132.

Position data is received, by the controller, for the optical multiplexer, the one or more light sources, and the multiple optical assemblies (404). The controller 142 can receive position data, e.g., relative orientations of the mirrors 134 of the optical multiplexer 132 or a particular fiber 206 selected by the filter wheel 208. A position of each of the light beams 126 within the powder bed 106 can be provided to the controller 142. Position of the each of the light beams 126 can be inferred, for example, using the respective positions of the components of the optical assemblies 122, e.g., an orientation of a polygonal mirror scanner or galvo mirror scanner 123. Locations of each of the multiple melt pools 146 can be determined, for example, utilizing the position data.

One or more melt pool characteristics are determined from the position data and the return light (406). Melt pool characteristics including respective locations of each of the multiple melt pools 146 on the platform 104, temperature gradients of each melt pool 146, time-evolution of the melt pool 146, melt flow and viscosity, melt pool stability, sputtering, and other melt pool dynamics.

In some implementations, reflected light from one or more light sources 124 and the reflected light from the melt pool 146 can be captured via an optical assembly 122 and guided into the measurement device 144 via the optical multiplexer 132. Capturing reflected light can include directly light from a particular optical assembly 122 to the measurement device 144 by selecting a particular mirror 134a of the optical multiplexer 132 to be in an "on" position or by selecting a particular fiber 206 of the optical multiplexer 204 using the filter wheel 208.

Position data, e.g., light beam 126 location, can be combined with melt pool characteristics extracted from the reflected light captured by the measurement device 144 to determine, for example, if a particular optical assembly 122 is performing within a threshold performance value. One or more performance thresholds can be defined, e.g., by a user, to dictate the various aspects of the melt pool characteristics, e.g., range of melt pool size, thermal gradient range, minimum melt pool stability, a maximum amount of sputtering, etc.

The one or more melt pool characteristics are provided as output to the controller (408). The controller 142 can receive the melt pool characteristics as well as one or more performance thresholds for the melt pool characteristics. The controller 142 can perform analysis on the received information and determine that one or more characteristics of melt pool 146 generated is in violation of one or more performance thresholds. For example, a melt pool size may be larger than a range of melt pool dimensions defined by a performance threshold for the melt pool. In another example, a peak temperature of the melt pool thermal gradient might exceed a maximum threshold temperature of the melt pool defined by a performance threshold for the melt pool.

In response to the one or more melt pool characteristics, the controller adjusts one or more process parameters (410). A set of rules may be utilized to adjust one or more process parameters of the system 100 by the controller 142 responsive to the one or more melt pool characteristics. For example, a thermal gradient of the melt pool 146 determined to be outside a threshold range may be adjusted by adjusting a raster speed of the light beam 126, a power of the light beam 126, or a raster pattern of the light beam 126. The controller 142 may automatically adjust the one or more process parameters to compensate for the melt pool characteristics that are determined to be violating a performance threshold. In some implementations, controller 142 may prompt a user operating system 100, 200 for a manual adjustment of one or more process parameters responsive to a determined irregularity in the melt pool characteristics.

In some implementations, a machine-learned model may be trained to determine one or more adjustments to make to the operation of the system 100 in response to receiving the one or more melt pool characteristics.

CONCLUSION

The controller and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

A number of implementations have been described. Nevertheless, it will be understood that various modifications may be made. For example:

Other techniques can be used for dispensing the powder. For example, powder could be dispensed in a carrier fluid, e.g., a quickly evaporating liquid such as Isopropyl Alcohol (IPA), ethanol, or N-Methyl-2-pyrrolidone (NMP), and/or ejected from a piezoelectric print head. Alternatively, the powder could be pushed by a blade from a powder reservoir adjacent the build platform.

Although FIGS. 1 and 2 illustrate polygon scanners, the optical assemblies could use other types of scanners, e.g., a 2D galvo scanner. Alternatively, the system could include just a single polygon scanner or 1D galvo scanner, and the optical head could move laterally to provide relative motion along the axis perpendicular to the scan line could be provided by motion of the optical head. Any given scanner could be used for pre-heating and/or heat treatment and/or fusing of the powder.

For some powders, an electron beam could be used instead of a laser beam to fuse the powder. So the second energy delivery system could include an electron beam source and electron beam scanner rather than a light source and pair of galvo mirror scanners.

The various supports for the components can be implemented as a gantry supported on opposite ends or a cantilever assembly (e.g., supported on just one side of the platform 104).

Accordingly, other implementations are within the scope of the claims.

What is claimed is:

1. An additive manufacturing apparatus comprising:
a platform;
a dispenser configured to deliver a plurality of successive layers of feed material onto the platform;
one or more light sources configured to generate a plurality of light beams to selectively fuse feed material in a layer on the platform;
a plurality of optical assemblies to receive the plurality of light beams, each respective optical assembly configured to transmit a respective light beam along a respective optical path through the optical assembly, to direct the respective light beam to a respective scan spot on the layer of feed material on the platform, to scan the light beam to sweep the respective scan spot along a respective controllable path across the layer of feed material on the platform, and to receive return light emitted or reflected from the respective scan spot;
a measurement device; and
an optical multiplexer configured to selectively transmit the return light from a respective optical path of a selected respective optical assembly of the plurality of optical assemblies to the measurement device.

2. The apparatus of claim 1, wherein the optical multiplexer is configured to selectively transmit the return light from only the respective optical path of a plurality of optical paths via only the respective optical assembly of the plurality of optical assemblies.

3. The apparatus of claim 2, wherein the optical multiplexer comprises a plurality of adjustable mirrors, wherein each adjustable mirror is configured to selectively align the return light from the respective optical path via the respective optical assembly of the plurality of optical assemblies with the measurement device.

4. The apparatus of claim 2, wherein the optical multiplexer comprises:
a plurality of optical fibers, each optical fiber configured to transmit return light from the respective optical path via the respective optical assembly of the plurality of optical assemblies; and
an adjustable filter wheel, wherein each optical fiber of the plurality of optical fibers is aligned with the adjustable filter wheel and wherein the adjustable filter wheel is configured to selectively allow the return light from a particular optical fiber of the plurality of optical fibers to align with the measurement device.

5. The apparatus of claim 1, wherein the measurement device comprises one or more of a high-speed, high resolution camera or an infrared camera.

6. The apparatus of claim 1, comprising a controller is configured to operate the optical multiplexer to direct light from the plurality of optical assemblies to the measurement device in a particular sampling sequence.

7. The apparatus of claim 1, further comprising, a data processing apparatus in data communication with the measurement device and configured to perform the operations comprising:
   collecting, from the measurement device, return light along the plurality of optical paths via respective optical assemblies of the plurality of optical assemblies;
   receiving, from the controller, position data from the optical multiplexer, the one or more light sources, and the plurality of optical assemblies;
   determining, from the position data and the return light, one or more melt pool characteristics; and
   providing, as output to the controller, the one or more melt pool characteristics.

8. The apparatus of claim 7, wherein the controller is further configured to receive the one or more melt pool characteristics and, in response, adjusting one or more process parameters for one or more of the plurality of optical assemblies and light sources.

9. The apparatus of claim 1, wherein a first wavelength range of the plurality of light beams is different that a second wavelength range of the return light.

10. The apparatus of claim 1, further comprising an air knife.

11. The apparatus of claim 1, further comprising a heat source configured to pre-heat the feed material.

* * * * *